United States Patent
Peer et al.

(10) Patent No.: US 11,097,631 B2
(45) Date of Patent: Aug. 24, 2021

(54) METHOD FOR CHARGING A BATTERY OF A MOTOR VEHICLE BY AN EXTERNAL CHARGING STATION AND MOTOR VEHICLE DESIGNED TO CARRY OUT SUCH A METHOD

(71) Applicant: AUDI AG, Ingolstadt (DE)

(72) Inventors: Reinhard Peer, Gaimersheim (DE); Stefan Niemand, Pöcking (DE)

(73) Assignee: AUDI AG, Ingolstadt (DE)

( * ) Notice: Subject to any disclaimer, the term of this patent is extended or adjusted under 35 U.S.C. 154(b) by 217 days.

(21) Appl. No.: 16/519,468

(22) Filed: Jul. 23, 2019

(65) Prior Publication Data
US 2020/0055420 A1    Feb. 20, 2020

(30) Foreign Application Priority Data
Aug. 16, 2018 (DE) .......................... 102018213768.4

(51) Int. Cl.
*H02J 7/00* (2006.01)
*B60L 53/66* (2019.01)
*B60L 53/62* (2019.01)

(52) U.S. Cl.
CPC ............. *B60L 53/66* (2019.02); *B60L 53/62* (2019.02); *B60L 2240/54* (2013.01); *B60L 2240/72* (2013.01); *B60L 2250/22* (2013.01); *B60Y 2200/91* (2013.01); *B60Y 2300/91* (2013.01); *Y02T 90/12* (2013.01)

(58) Field of Classification Search
CPC ...... B60L 53/66; B60L 53/62; B60L 2250/22; B60L 2240/72; B60L 2240/54; Y02T 90/12; B60Y 2300/91; B60Y 2200/91

USPC ............................................. 320/109; 701/22
See application file for complete search history.

(56) References Cited

U.S. PATENT DOCUMENTS

| | | | |
|---|---|---|---|
| 2012/0166012 A1* | 6/2012 | Lee .......................... | B60L 53/62 700/297 |
| 2014/0089016 A1* | 3/2014 | Smullin .................. | G06Q 10/02 705/5 |

FOREIGN PATENT DOCUMENTS

| | | |
|---|---|---|
| DE | 10 2015 201 895 A1 | 8/2016 |
| DE | 10 2015 201 897 A1 | 8/2016 |
| DE | 10 2016 208 316 A1 | 8/2017 |

OTHER PUBLICATIONS

Examination Report dated Feb. 22, 2019 in corresponding German application No. 10 2018 213 768.4; 26 pages.

* cited by examiner

*Primary Examiner* — Zixuan Zhou
(74) *Attorney, Agent, or Firm* — Maier & Maier, PLLC

(57) ABSTRACT

The disclosure relates to a method for charging a battery of a motor vehicle by an external charging station and to a motor vehicle which is designed to carry out such a method. The method includes the following steps which occur before coupling the motor vehicle to the charging station for charging the battery of the motor vehicle: first, on the basis of charging station data received by a motor vehicle, data which characterizes a current maximum charging capacity of the charging station, it is verified whether a predetermined charging state of the battery of the motor vehicle can be achieved by the charging station within a predetermined time. If the predetermined charging state of the battery cannot be achieved, a warning signal is issued.

19 Claims, 1 Drawing Sheet

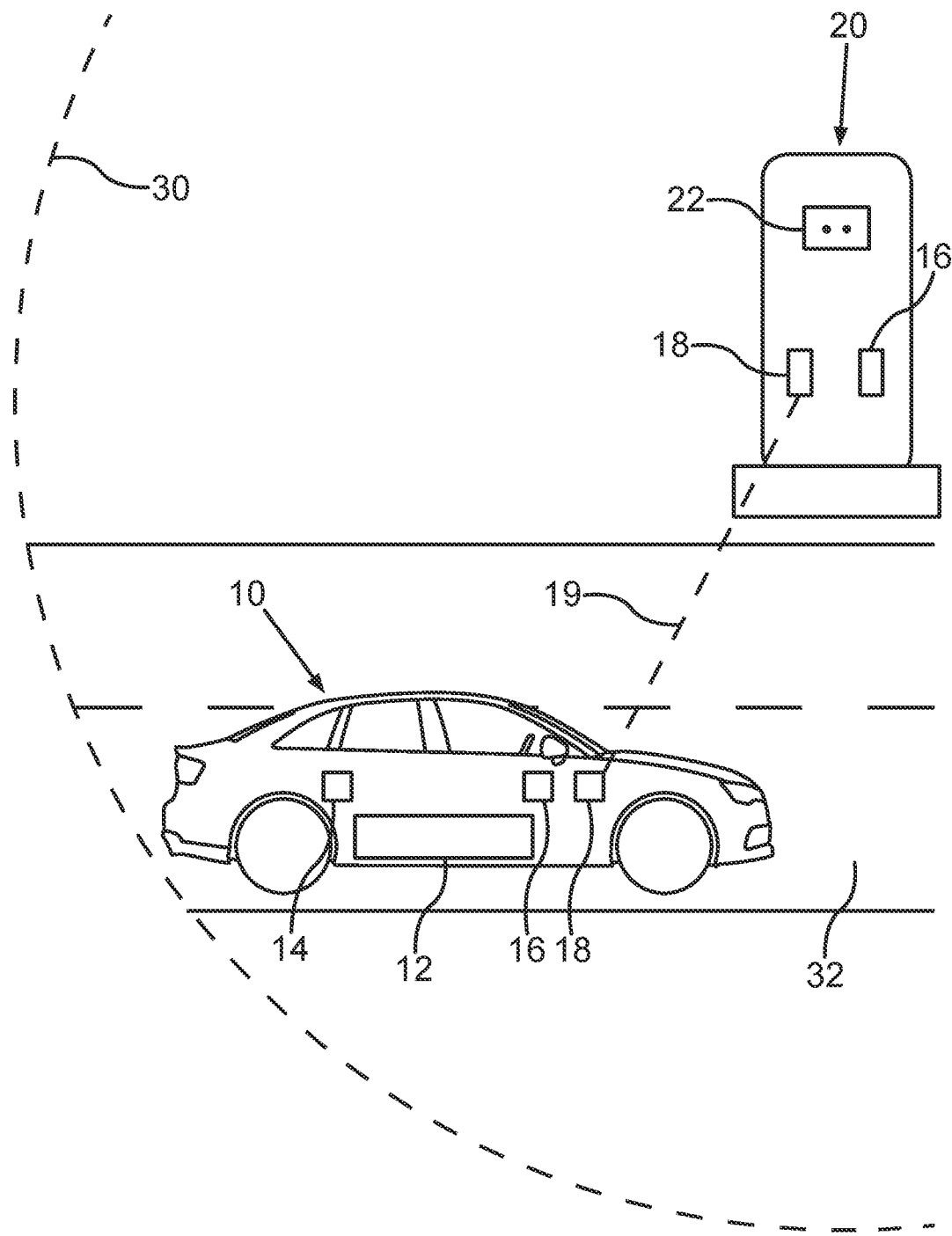

METHOD FOR CHARGING A BATTERY OF A MOTOR VEHICLE BY AN EXTERNAL CHARGING STATION AND MOTOR VEHICLE DESIGNED TO CARRY OUT SUCH A METHOD

FIELD

The discloser relates to a method for charging a battery of a motor vehicle by an external charging station and to a motor vehicle with a battery, which is designed to carry out such a method.

BACKGROUND

For charging a battery of a motor vehicle equipped with an electrical driving engine, the same charging stations are often repeatedly approached by a user of the motor vehicle. These charging station are located, for example, in the vicinity of a residence or workplace of the user. Thus, for example, they are located along a road in a residential area or on a private parking area of the user. However, if multiple charging stations are located within the residential area at which multiple motor vehicles are charged simultaneously, it can occur that there is a reduced charging capacity at the individual respective charging stations, for example, due to variations in the electrical power grid or due to insufficient supply of this residential area with electrical power. This results in a reduction of a charging state which can ordinarily be achieved for the batteries of the respective motor vehicles for a predetermined charging duration, for example, overnight.

In this case, the next day, the motor vehicle has only a reduced cruising range in comparison to a charging procedure at a charging station with maximum possible charging capacity. However, if the user of the motor vehicle has scheduled a longer trip with a motor vehicle, for example, a longer business trip, it may be very unpleasant for him/her if, due to the reduced charging capacity of his/her charging station, his/her motor vehicle has a smaller cruising range than the cruising range usually provided after a night of charging at the charging station. The user would subsequently be forced to schedule on the following day an additional stop at another charging station, resulting for him/her in a loss of time and in other undesired and unplanned inconveniences.

In DE 10 2015 201 897 A1, a method for generating and issuing a schedule for automatic charging of an electrical energy storage in a vehicle is described. Here, an energy content of the energy storage and a charging current which can be provided by a charging device are acquired. Taking into consideration a user input, a schedule for automatic charging of the energy storage can subsequently be generated, and, in the end, implemented by means of the method. However, here, the vehicle is first connected to a charging device and then a decision is made as to whether the energy storage of the vehicle should be charged immediately or programmed by means of a timer function. If the vehicle should be charged with the help of a timer function but is not yet connected to the charging device, then, on the basis of the energy content of the energy storage, of the charging current of the charging device, which can be provided, and of the end time of the scheduled charging procedure, the latest possible connection time at which the vehicle must be connected to a charging device is determined. However, if the vehicle is not connected to the charging device while the charging procedure is being scheduled, then, in the selection of the charging device, the user must take into consideration the charging current at which the charging procedure ends at the scheduled departure time. Here, different charging durations for different typical charging currents of charging devices are displayed, so that the user can select the charging duration best suited for him/her. Any charging currents that currently deviate from the typical charging currents and thus vary over time are not taken into consideration in the context of the described method.

In DE 2015 201 895 A1, a method for acquiring settable scheduling parameters for generating a schedule for the automatic charging of an electrical energy storage in a vehicle is described. Here, a charging current of a charging device is also taken into consideration in the context of the schedule preparation. Here, a user has different possible charging current intensities available to be selected as scheduling parameters, for example, as in a conventional wall box or a rapid charging station. Depending on which charging current is selected by the user, a corresponding schedule for the automatic charging is prepared. In this manner, the user sees in a rapid and effectively understandable manner how long the charging of the battery lasts depending on the charging current which can be provided. However, here, as described, a distinction is made only between different types of charging procedures or charging stations.

In DE 10 2016 208 316 A1, a method for controlling a theft protection requirement for a charging connection is described. Here, a user of the vehicle is enabled to charge the motor vehicle, while a theft protection system is activated. If a separation of a socket and of a charging plug of the vehicle occurs, a warning noise or warning light is issued, if certain unlocking conditions are not met.

SUMMARY

The aim of the invention is to provide a solution by means of which a user of a motor vehicle can schedule a charging procedure of a battery of the motor vehicle in a particularly simple and early manner, taking into consideration variations of a charging capacity of a charging station.

This aim is achieved by a method for charging a battery of a motor vehicle by means of an external charging station according to the independent claim. Advantageous designs with appropriate and non-trivial developments of the invention are indicated in the disclosure.

The method according to the invention for charging a battery of a motor vehicle by means of an external charging station comprises the following steps: Before coupling the motor vehicle to the charging station, on the basis of charging station data received by means of the motor vehicle, data which characterizes a current maximum charging capacity of the charging station, it is verified whether a predetermined charging state of the battery of the motor vehicle can be achieved by means of the charging station within a predetermined time. If the predetermined charging state of the battery cannot be achieved, a warning signal is issued.

The method according to the invention is thus carried out already before starting a charging procedure for the motor vehicle with the external charging station, that is to say before energy transfer from the charging station to the motor vehicle. The external charging station is preferably an automatic charging device designed, for example, as a wall charging station or a charging post designed for charging via an automatic plug connection or as a charging device designed for inductive charging. The charging capacity of a charging station is a very important criterion for how long the motor vehicle must be connected to the charging station for charging the battery in order to produce a desired charging state. A typical industrial socket provides a charging capacity of typically 3.6 kilowatt, while a charging post typically provides charging capacities of 11 kilowatt to 22 kilowatt, and a quick charging post typically provides 50 kilowatt to 170 kilowatt. The charging capacity of a charging station moreover in general depends on the type of charging station and, in association therewith, on the charging type of the battery which can be carried out with this type of charging station. Charging stations with an alternating current connection, for example, typically have lower maximum charging capacities than direct current charging stations. However, depending on the electric power grid load, the current maximum charging capacity of a charging station can also be less than the mentioned maximum charging capacities.

In the context of the method according to the invention, it is therefore first verified whether the current maximum charging capacity of a charging station is sufficient to achieve a desired charging state of the battery of the motor vehicle within a desired time, for example, eight hours, that is to say, for example, within a typical overnight parking time of the motor vehicle. For this purpose, the motor vehicle receives information concerning the charging station, the so-called charging station data, via a communication connection. If it is already foreseeable that the desired charging state cannot be achieved in the predetermined time with a current maximum charging capacity, the user of the motor vehicle is informed of this in that a corresponding warning signal is issued, for example, a display on a display device in the motor vehicle or an acoustic warning message.

If the predetermined charging state is not possible with the corresponding charging station from which the charging station data was received, the user of the motor vehicle has the option of not connecting the motor vehicle to this charging station as planned, but can instead drive, for example, to another charging station in the vicinity. In addition, with the help of the warning signal, it can be communicated to the user that, although the desired charging state is, for example, not possible with the help of an inductive charging procedure by means of the charging station, the desired charging state could nevertheless be achieved within the predetermined time by connecting a charging cable of the motor vehicle to this same charging station. With the help of the warning signal, the user is thus informed directly of the increased charging demand of his/her motor vehicle with respect to the current charging capacity of the charging station. Thereby, the user can already react proactively ahead of time in that, for example, he/she selects a higher charging capacity, in that he/she activates a charging of the battery via a cable connection to the charging station, or schedules an additional stop at a quick charging station the next day for additional charging of the battery until the desired charging state is achieved. In this way, it is possible to prevent that an insufficient charging state of the battery has been achieved at the time of the next use of the motor vehicle, which could have a detrimental effect on the confidence of the user in electromobility.

In an additional advantageous embodiment of the invention, it is provided that the charging station data is transmitted to the motor vehicle as soon as the motor vehicle is within a predetermined radius of the charging station. As soon as the motor vehicle stops in the vicinity of the charging station, for example, at a location within a 200-meter radius of the charging station, a communication connection between the motor vehicle and the charging station is set up, via which the charging station data containing information on the current maximum charging capacity of the charging station is transmitted to the motor vehicle. This has the advantage that the motor vehicle does not possibly receive charging station data from arbitrary charging stations, but instead a geographic preselection of potentially relevant charging stations for the motor vehicle is determined automatically.

In an additional embodiment of the invention it is provided that the charging station data is transmitted to the motor vehicle as soon as a charging request for charging the battery of the motor vehicle has been activated. It can thus be provided that the user of the motor vehicle must first actively express that he/she wishes to charge the battery of the motor vehicle. For this purpose, he/she can, for example, actuate a corresponding actuation element of a display surface in the vehicle interior or on a mobile terminal of the user. Alternatively, it is possible for the motor vehicle to automatically activate a charging request for charging the battery in the case of a predetermined charging state or at a predetermined time, whereby an automatic search for an appropriate charging station occurs.

Particularly preferably, it is provided that the charging station data is received by the motor vehicle when the motor vehicle is both located within the predetermined radius of the charging station and the charging request has been activated, said charging request requesting the charging of the battery of the motor vehicle by means of the charging station.

If a transmission of the charging station data to the motor vehicle is initiated just after the activation of the charging request for charging the battery of the motor vehicle, the current maximum charging capacity of a predetermined charging station, for example, of the charging station in the vicinity of the residence of the user of the motor vehicle, can already be requested from a relatively long distance. This enables a particularly early scheduling of the charging of the battery of the motor vehicle by the user or by a control unit of the motor vehicle designed for this purpose.

In an additional advantageous embodiment of the invention, it is provided that the charging station data is transmitted at least indirectly from the charging station to the motor vehicle as soon as the motor vehicle requests the charging station data. Thus, it is possible for the charging station data to be transmitted directly from the charging station to the motor vehicle, but only after the charging station data has been actively requested on the part of the motor vehicle. Thus, a direct data transmission from the charging station to the motor vehicle is possible. However, alternatively, it is also possible for the charging station data to be transmitted only indirectly, and, in particular, for example, via an external server device. In this example, the charging station transmits the charging station data first to the external server device which subsequently transmits the charging station data to the motor vehicle. Independently of whether or not the data is transmitted directly from the charging station to the motor vehicle, the prerequisite for the motor vehicle receiving the charging station data is that said motor vehicle has first requested the charging station data. As trigger for the requesting of the charging station data, either the activation of the charging request occurs and/or the motor vehicle is located within the predetermined radius of the charging station.

An additional advantageous development of the invention provides that the charging station continuously sends the charging station data which can be received by the motor vehicle. Thus, it is possible for the charging station data to be transmitted continuously and at predetermined time intervals of, for example, ten seconds from the charging station. This transmitted charging station data can subsequently always be actively received by the motor vehicle, that is to say a corresponding receiving device in the motor vehicle can always be activated, when the motor vehicle is located within the predetermined radius of the charging station and/or when the charging request for charging the battery of the motor vehicle is has been activated.

Thus, various possibilities for technical implementation of the transmission of the charging station data from the external charging station to the motor vehicle are possible. Therefore, with low technical effort on the vehicle side, it can be achieved that the motor vehicle receives the charging station data already before coupling of the motor vehicle to the charging station for charging the battery of the motor vehicle, and, based on this charging station data, verifies whether the predetermined charging state of the battery of the motor vehicle can be achieved within the predetermined time and, optionally, whether to issue the warning signal in the case of a charging state which cannot be achieved.

An additional advantageous embodiment of the invention provides that the predetermined charging state is established on the basis of a desired cruising range of the motor vehicle. Usual cruising ranges of motor vehicles which have an electric driving engine are between several kilometers to several 100 kilometers. Depending on the typical distances covered by the user of the motor vehicle daily with this motor vehicle, a corresponding desired cruising range can be established in the motor vehicle. This desired cruising range can either be manually input by the user and thus be stored or it can be predetermined as a stored standard value. As such a standard value, for example, the maximum cruising range of the motor vehicle possible with a fully charged battery, for example, 400 kilometers, can be established. If this desired cruising range of 400 kilometers, which is connected with a corresponding charging state of the battery, cannot be achieved taking into consideration the current maximum charging capacity as well as the predetermined time, the issuing of the warning signal occurs.

The predetermined time can also be stored manually by the user in the motor vehicle or it can be predetermined as a stored standard value. The predetermined time can be, for example, a time window of five hours if this time is considered the typical resting time of the motor vehicle, taking into consideration a typical daily routine of the user of the motor vehicle.

On the basis of the desired cruising range, it is thus possible that a warning signal is issued to the user of the motor vehicle precisely when, on the basis of the current maximum charging capacity and the predetermined charging time, the user can expect that during a next trip with the motor vehicle he/she cannot achieve the desired and/or usual cruising range. Subsequently, the user can schedule and carry out alternatives in time for charging the battery based on the current charging capacity of the charging station.

An additional advantageous embodiment of the invention provides that during the verification of whether the predetermined charging state of the battery can be achieved, at least one of the following parameters is taken into consideration: a current charging state of the battery, a desired cruising range of the motor vehicle, a charging time of the battery, a maximum charging capacity of the battery, a way of performing the charging of the battery, an energy consumption of loads in the motor vehicle during the charging of the battery, an outside temperature.

The predetermined charging state, which is established on the basis of the desired cruising range and on the basis of the predetermined time, depends, among other factors, on the current charging state of the battery. From the difference between the predetermined and the current charging state of the battery, it is in fact possible to determine how long and at which charging capacity the battery of the motor vehicle must be charged in order to achieve the predetermined charging state. In addition, the desired cruising range of the motor vehicle which has been stored, for example, manually by the user in the motor vehicle, should be verified to determine whether this desired cruising range is at all realistic and sensible for the motor vehicle with the battery. In addition, a preferred or, for example, a maximum possible charging time of the battery can be taken into consideration. Here, it is possible, for example, to take into consideration that the vehicle is parked on a Friday evening at the charging station for the charging, so that a pending charging time span on Friday evening, that is to say the actual time for charging, may be longer than between two work days. In addition, the maximum charging capacity of the battery should be taken into consideration. Possibly, the current maximum charging capacity exceeds the actually permitted charging capacity of the battery, so that this must be taken into consideration in the verification step of the method. Possibly, the issuing of a warning signal therefore occurs although a particularly high current maximum charging capacity is available per se. Moreover, in the evaluation of whether the predetermined charging state can be achieved, the way of performing the charging of the battery, that is to say a charging type, is taken into consideration. This is sensible since possibly there are differences in the current maximum charging capacity between different charging types such as, for example, inductive charging or direct current charging with connected charging cable. In addition, the energy consumption of loads in the motor vehicle during the charging of the battery can be taken into consideration, when, for example, the desired cruising range is not achieved in spite of sufficient current maximum charging capacity, because an unexpectedly high energy consumption occurred during the charging of the battery. In addition, the outside temperature which exists in the surroundings of the motor vehicle and which is acquired, for example, with a temperature sensor of the motor vehicle, can be taken into consideration. The outside temperature influences, for example, the energy consumption of an air conditioning system or of a heating unit of the motor vehicle and can thus influence the cruising range of the motor vehicle. With the mentioned parameters, it is possible to estimate in a particularly reliable manner overall whether the predetermined charging state of the battery can or cannot be achieved.

A development of the method according to the invention provides that the predetermined charging state can be set by a user of the motor vehicle. Alternatively to the already described standard setting which predetermines, for example, a desired cruising range of 400 kilometers after each charging procedure for the battery of the motor vehicle, a user-dependent cruising range of the motor vehicle can thus also be predetermined, on the basis of which the predetermined charging state is defined. Such a personalized input of the predetermined charging state is appropriate, for example, when large variations of the necessary cruising range of the motor vehicle are to be expected, as can be the case, for example, if the users frequently take business trips to destinations at different distances. This provision is particularly sensible and advantageous for the user of the vehicle, since it reduces frustration on the part of the user due to an insufficiently charged battery of the motor vehicle.

An additional advantageous development of the method according to the invention provides that the predetermined charging state is set on the basis of energy consumption data stored in the motor vehicle from previous trips with a motor vehicle. Thus, in addition, on the basis of historical data, values based on experience with regard to the driving behavior of the user of the motor vehicle can be accessed. In particular, for users who cover identical or similar distances and driving routes on a regular basis, it can thereby be predicted with particularly high reliability, without the need of additional user input, desired cruising range that should be assumed for establishing the predetermined charging state. Thereby, the method according to the invention can be used with particularly low effort for the user of the motor vehicle, since said user does not have to perform elaborate settings with regard to the desired cruising range of the motor vehicle.

In an additional advantageous embodiment of the invention, it is provided that the predetermined charging state is automatically set on the basis of provided user-specific potential energy consumption data, in particular taking into consideration calendar entries of the user. Thus, an individualized and intelligent setting of the predetermined charging state is possible, since it is known, for example from stored calendar data, whether the next day a particularly long trip with the motor vehicle scheduled or not, for example, for a business trip. Hereby, using the method according to the invention it is made possible to automatically set, without particular effort on the part of the user of the vehicle, the desired cruising range, always in an updated manner adapted to the desires and needs of the user of the motor vehicle. The prerequisite for this is that the corresponding calendar entries of the user and other possible user-specific energy consumption data, stored, for example, manually by the user in the motor vehicle, are provided for this purpose. The data transmission of this user-specific potential energy consumption data can occur, for example, via a mobile radio connection with a mobile terminal of the user or via a corresponding data transmission from an external server device on which the corresponding user-specific potential energy consumption data is stored, for example, in the form of calendar entries of the user.

Additionally provided according to the invention is a motor vehicle with a battery for supplying an electric driving engine of the vehicle with electrical energy, which is designed to carry out the above-described method. To the extent applicable, the preferred designs presented in connection with the method according to the invention and their advantages apply accordingly to the motor vehicle according to the invention.

BRIEF DESCRIPTION OF THE FIGURE

Below, an embodiment example of the invention is described.

FIG. 1 shows a diagrammatic representation of a motor vehicle with a battery, which is located within the radius of a charging station for charging the battery of the motor vehicle.

DETAILED DESCRIPTION

The embodiment example explained below is a preferred embodiment of the invention. In the embodiment example, the described components of the embodiment each represent individual features of the invention to be considered independently of one another, each also further developing the invention independently of one another. Therefore, the disclosure should also cover combinations of features of the embodiment other than those represented. Moreover, the described embodiment can also be completed by features of the invention other than those already described.

In FIG. 1, identical reference numerals designate in each case functionally equivalent elements.

In FIG. 1, a motor vehicle 10 is outlined, which comprises a battery 12 for supplying an electric driving engine 14 of the motor vehicle 10 with electrical energy. The motor vehicle 10 in addition comprises a control unit 16 and a communication interface 18.

The motor vehicle 10 is currently driving on a road 32, but is planning a stop for charging the battery 12, due to a relatively low current charging state of the battery 12. In the vicinity of the motor vehicle 10, an external charging station 20 is located, which is designed at least for charging the battery 12 of the motor vehicle 10 via a cable connection to the motor vehicle 10. The external charging station 20 therefore has a socket 22 as well as a communication interface 18 and a control unit 16. The external charging station 20 is in addition designed to carry out an automatic charging procedure, that is to say, for example, to automatically set up a plug connection between the external charging station 20 and the motor vehicle 10.

As soon as the motor vehicle 10 is located within a predetermined radius 30 of the charging station 20 and as soon as an automatic charging request for charging the battery 12 of the motor vehicle 10 has been activated by the control unit 16 of the motor vehicle 10, a communication connection 19 between the communication interfaces 18 of the motor vehicle 10 and of the charging station 20 is set up. Via this communication connection 19, the control unit 16 of the motor vehicle 10 transmits to the control unit 16 of the charging station 20, on the basis of the charging request, a request for the transmission of charging station data. This charging station data characterizes a current maximum charging capacity of the charging station 20. As soon as the motor vehicle 10 has received this charging station data, it is verified whether a predetermined charging state of the battery 12 of the motor vehicle 10 can be achieved by means of the charging station 20 within a predetermined time. If the predetermined charging state of the battery 12 cannot be achieved, a warning signal is issued for a user of the motor vehicle 10. The method is thus carried out before coupling the motor vehicle 10 to the charging station 20.

The predetermined charging state which is taken into consideration in this verification is established on the basis of a desired cruising range of the motor vehicle 10, which is 50 kilometers, for example. This desired cruising range of 50 kilometers can be stored, for example, by the user of the motor vehicle 10 or be provided as standard setting in the motor vehicle 10. In addition, in the motor vehicle 10, a predetermined time is stored, which is assumed to be the time available for charging the battery 12 with the charging station 20. This predetermined time can be a time of eight hours, for example. This time is to be expected as minimum time available for charging the battery 12 between two trips of the user with the motor vehicle 10, if the charging procedure of the motor vehicle 10 takes place overnight between two workdays. The predetermined time can either also be predetermined manually by the user of the motor vehicle 10 or be stored as standard setting in the motor vehicle 10.

The desired predetermined charging state to be achieved after the charging of the battery 12 with the charging station 20 can, alternatively to the establishment of this value already described above, be set on the basis of energy consumption data of previous trips with the motor vehicle 10 stored in the control unit 16 of the motor vehicle 10. Alternatively or additionally thereto, the predetermined charging state can be automatically set on the basis of provided user-specific potential energy consumption data. For this purpose, calendar entries of the user of the motor vehicle 10 can be taken into consideration in particular. Thus, it is possible to take into consideration historical data for the determination of the predetermined charging state, data which contains information on typically necessary cruising ranges of the user with the motor vehicle 10. Taking into consideration, for example, calendar entries, a particularly intelligent and user-specific establishment of the predetermined charging state is additionally possible. Here, it can be taken into consideration, for example, when a travel trip of 150 kilometers is scheduled for the next day, and therefore the charging state provided as standard so far, which is connected with a cruising range of 50 kilometers, is now insufficient and must be adapted accordingly.

When verifying whether the predetermined charging state of the battery 12 can be achieved, a current charging state of the battery 12, a desired cruising range of the motor vehicle 10, a charging time of the battery 12, a maximum charging capacity of the battery 12, a way of performing the charging of the battery 12, an energy consumption of loads in the motor vehicle 10 during the charging of the battery 12 and/or an outside temperature is/are taken into consideration.

The charging station data can be transmitted either directly from the charging station 20 to the motor vehicle 10, that is to say directly via the communication connection 19 from the control unit 16 of the charging station 20 to the control unit 16 of the motor vehicle 10. Or alternatively to this, it is possible for this data to be transmitted first to an external server device which subsequently transmits the charging station data to the motor vehicle 10 by means of a corresponding communication connection 19.

Alternatively to the described scenario in which the motor vehicle 10 is located within the predetermined radius 30 of the charging station 20, and, in addition, a charging request for charging the battery 12 of the motor vehicle 10 has been activated, the motor vehicle 10 can also be located at any greater distance from the charging station 20 but nevertheless receive the charging station data on the basis of the activated charging request. In addition, it would also be conceivable for the motor vehicle 10 to receive the charging station data without activated charging request, just because it is located within the predetermined radius 30 of the charging station 20, in order, for example, to be able to estimate thereupon whether a manual or automatic activation of the charging request would be appropriate.

In addition it is possible for the charging station 20 to continuously send charging station data which can be received by the motor vehicle 10. For example, a receiving device of the motor vehicle 10 can be activated only when a charging request for charging the battery 12 of the motor vehicle 10 has been activated, and subsequently the respective charging station data is actively received by the charging station 20 in the current surroundings of the motor vehicle 10.

The warning signal, issued in the situation in which the predetermined charging state of the battery 12 cannot be achieved with the current maximum charging capacity within the desired time, is, for example, a corresponding display on a display surface in the motor vehicle interior. In the context of this display, it can be displayed to the user of the motor vehicle 10, for example, that the current maximum charging capacity of the charging station 20 is in fact insufficient for charging the battery 12 as desired, but that this would be possible within a time window increased by 30 minutes. The user of the motor vehicle 10 can thereafter decide whether he/she nevertheless wants to charge the battery 12 at the charging station 20 taking into consideration the longer indicated time for charging the battery 12, or whether he/she wishes to continue to drive, for example, to another charging station 20 which has a higher current maximum charging capacity in order to charge the battery 12. The warning signal issued can thus contain detailed information on the desired charging request of the motor vehicle 10. In addition, the warning signal can be expressed with the help of an acoustic signal, for example, a corresponding voice message.

Overall, the example shows how, already before coupling the motor vehicle 10 to the charging station 20 for charging the battery 12 of the motor vehicle 10, it can be verified whether a current maximum charging capacity of the charging station 20 is sufficient to achieve a predetermined charging state of the motor vehicle 10 by means of the charging station 20 within a predetermined time. If this is not the case, then, by means of the issued warning signal, the user of the motor vehicle 10 can be informed of this, so that said user should schedule alternative or additional steps in order to be able in the end to achieve the predetermined charging state requested by him/her.

The invention claimed is:

1. A method for charging a battery of a motor vehicle by an external charging station, comprising the following steps:
   before coupling the motor vehicle to the charging station for charging the battery of the motor vehicle,
   verifying on the basis of charging station data received by the motor vehicle, data which includes a current maximum charging capacity of the charging station, whether a predetermined charging state of the battery of the motor vehicle can be achieved by the charging station within a predetermined time wherein the charging station continuously transmits the charging station data which are configured to be received by the motor vehicle;
   if the predetermined charging state of the battery cannot be achieved within the predetermined time, issuing of a warning signal.

2. The method according to claim 1, wherein the charging station data is transmitted to the motor vehicle as soon as the motor vehicle is within a predetermined radius of the charging station.

3. The method according to claim 1, wherein the charging station data is transmitted to the motor vehicle as soon as a charging request for charging the battery of the motor vehicle has been activated.

4. The method according to claim 1, wherein the charging station data is transmitted at least indirectly from the charging station to the motor vehicle as soon as the motor vehicle requests the charging station data.

5. The method according to claim 1, wherein the predetermined charging state is established on the basis of a desired cruising range of the motor vehicle.

6. The method according to claim 1, wherein during the verification of whether the predetermined charging state of the battery can be achieved, at least one of the following parameters is taken into consideration; a current charging state of the battery; a desired cruising range of the motor vehicle; a charging time of the battery; a maximum charging capacity of the battery; a way of performing the charging of the battery; an energy consumption of loads in the motor vehicle during the charging of the battery; and an outside temperature.

7. The method according to claim 1, wherein the predetermined charging state can be set by a user of the motor vehicle.

8. The method according to claim 1, wherein the predetermined charging state can be set on the basis of energy consumption data of previous trips with the motor vehicle, which is stored in the motor vehicle.

9. The method according to claim 1, wherein the predetermined charging state is set automatically on the basis of the provided user-specific potential energy consumption data, in particular taking into consideration calendar entries of the user.

10. The method according to claim 2, wherein the charging station data is transmitted to the motor vehicle as soon as a charging request for charging the battery of the motor vehicle has been activated.

11. The method according to claim 2, wherein the charging station data is transmitted at least indirectly from the charging station to the motor vehicle as soon as the motor vehicle requests the charging station data.

12. The method according to claim 3, wherein the charging station data is transmitted at least indirectly from the charging station to the motor vehicle as soon as the motor vehicle requests the charging station data.

13. The method according to claim 2, wherein the charging station continuously sends the charging station data which can be received by the motor vehicle.

14. The method according to claim 3, wherein the charging station continuously sends the charging station data which can be received by the motor vehicle.

15. The method according to claim 4, wherein the charging station continuously sends the charging station data which can be received by the motor vehicle.

16. The method according to claim 2, wherein the predetermined charging state is established on the basis of a desired cruising range of the motor vehicle.

17. The method according to claim 3, wherein the predetermined charging state is established on the basis of a desired cruising range of the motor vehicle.

18. The method according to claim 4, wherein the predetermined charging state is established on the basis of a desired cruising range of the motor vehicle.

19. The method according to claim 1, wherein the predetermined charging state is established on the basis of a desired cruising range of the motor vehicle.

* * * * *